June 17, 1952  C. L. COMEGYS ET AL  2,600,972
ADDRESS PLATE RETAINING MEANS
Filed Oct. 8, 1947
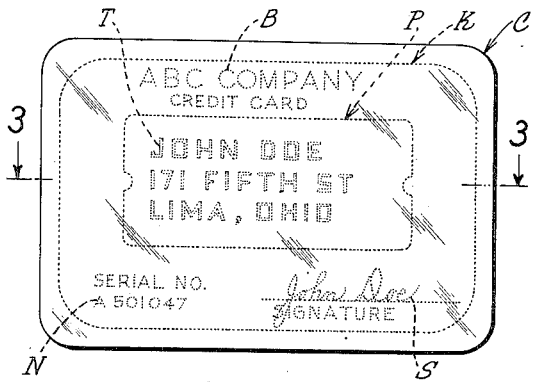
FIG. 1
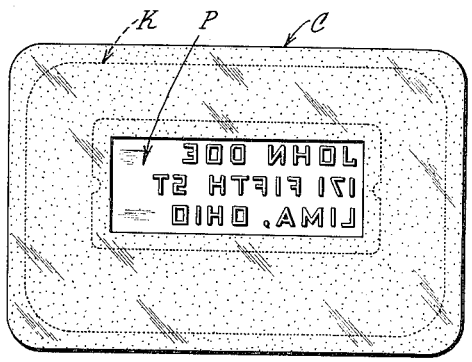
FIG. 2
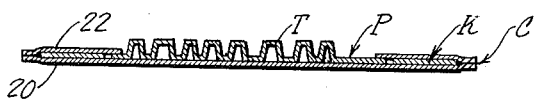
FIG. 3
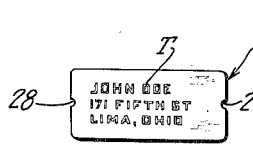
FIG. 4
FIG. 5
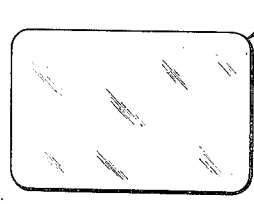
FIG. 6
FIG. 7
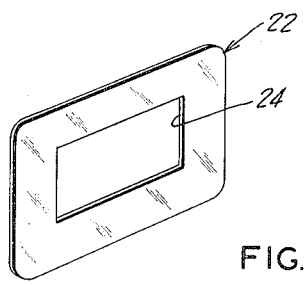
FIG. 8
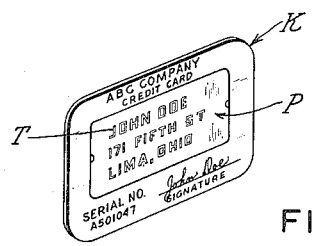
FIG. 9
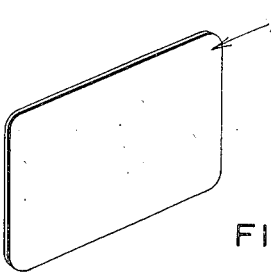
FIG. 10
INVENTORS.
COURTNEY L. COMEGYS
ELMER A. HAIG
BY Wallace and Cannon
ATTORNEYS Patented June 17, 1952

2,600,972

UNITED STATES PATENT OFFICE 2,600,972

ADDRESS PLATE RETAINING MEANS

Courtney Lee Comegys, University Heights, and Elmer A. Haig, Shaker Heights, Ohio, assignors to Addressograph-Multigraph Corporation, Wilmington, Del., a corporation of Delaware Application October 8, 1947, Serial No. 778,632

4 Claims. (Cl. 101—369)

This invention relates to printing devices of the kind from which data, such as a name and address may be printed to insure accuracy in preparing business instruments and the like in connection with business transactions entailing, for example, the extension of credit pursuant to data borne by the printing devices.

Many business institutions, such as, for example, department stores, commercial air lines, railroads, automobile service companies, and the like, which have a relatively large number of customers and sometimes also outlets or business places scattered over a wide area, have adopted the practice of furnishing reliable customers with an identification, commonly referred to as a credit-card, entitling that customer to make purchases on credit at any one of the places of business of the company.

Certain of such cards heretofore used for this purpose have comprised nothing more than a single-element card having the name and address of the applicant together with other identifying data appearing thereon, and when these cards are used, the name, address and other data must be copied from the card in making a record of each transaction. However, our invention is primarily concerned with another type of identification card, which comprises a printing device from which the name, and address of the customer and the other related data necessary to make an identification record for each transaction may be directly printed.

In credit cards of this latter character it is desirable that the card comprise identification means as well as printing means, and it is a primary object of our invention to afford a printing device which is well adapted to be used as a credit card and which embodies an identification member and a printing member associated with each other in a novel and expeditious manner.

Also, it is often desirable that, when credit cards are used, certain information, such as, for example, the name of the company issuing the card, the conditions under which the card is issued, the regulations governing the use thereof, and the like, appear on the face of the card. Furthermore, it is desirable that this information be embodied on a portion of the credit card which can be readily and economically printed or otherwise prepared. However, it is also desirable that the data which are to be printed directly from the credit card be embodied on a portion thereof which will withstand the wear and abuse of repeated printing operations without materially impairing the printing characteristics thereof, although, of course, it is also desirable that this portion of the credit card be economically constructed and prepared. Furthermore, it is often desirable that a carrier be provided for the identification member and the printing member which will protect them from mutilation, it being especially important that such a carrier be provided when the credit card is to be carried on the person of the customer or is subject to frequent and, perhaps, careless handling.

It is another object of our invention to effect and realize the aforesaid desirable characteristics in a printing device adapted to comprise a credit card, and more specifically, further objects of our invention are to provide a novel printing device comprising a credit card and embodying an identification member, a printing member and a carrier, as aforesaid, and which is constructed in a novel and expeditious manner; to provide a thin, compact printing device of the type adapted to comprise a credit card free from projecting elements and which can be readily and economically produced, and to provide a printing device of the aforesaid character wherein the printing member is positively held in place relative to the identification member in a novel and expeditious manner.

Another important consideration to business institutions which issue credit cards is to guard against the fabrication and use of spurious credit cards and also the alteration of otherwise valid cards. In this connection, further objects of our invention are to so arrange a printing device adapted to be used as a credit card in such a manner as to render it difficult for unauthorized persons to fabricate spurious credit cards in simulation thereof; to so arrange a printing device that undetectable alteration of identifying data and other information thereon may be avoided; and to provide a printing device of the aforesaid character which is capable of carrying the signature of the person to whom the card was validly issued, and wherein the signature, although being readily visible is protected in such a manner, in the card when issued, that effective protection is afforded against undetected alteration of the signature after issuance of the card.

A further object of our invention is to so arrange a printing device of the aforesaid character that the carrier element thereof affords an effective protective cover for other elements thereof and yet enables the data and information on such other elements to be readily visible through the carrier.

Another object of our invention is to provide a printing device of the aforesaid character wherein the carrier member thereof is effectively sealed onto the identification member and printing member.

Yet another object of our invention is to construct the carrier member of our novel printing device in such a manner that it renders the printing device especially easy to hold onto during the handling thereof.

Other and further objects of the present invention will be apparent from the following description and claims and are illustrated in the accompanying drawings which, by way of illustration, show a preferred embodiment and the principle thereof and what we now consider to be the best mode in which we have contemplated applying that principle. Other embodiments of the invention embodying the same or equivalent principles may be used and structural changes may be made as desired by those skilled in the art without departing from the present invention and the purview of the appended claims.

In the drawing:

Fig. 1 is a front elevational view of a device embodying our invention;

Fig. 2 is a rear elevational view of the device shown in Fig. 1;

Fig. 3 is a sectional view taken substantially along the line 3—3 on Fig. 1;

Fig. 4 is a detail front elevational view of the card member embodied in the device shown in Fig. 1;

Fig. 5 is a detail front elevational view of the printing plate embodied in the device shown in Fig. 1;

Fig. 6 is a detail front elevational view of the front wall or front layer of the carrier embodied in the device shown in Fig. 1;

Fig. 7 is a detail front elevational view of the rear wall or rear layer of the carrier embodied in the device shown in Fig. 1;

Fig. 8 is a detail front perspective view of the rear wall shown in Fig. 7;

Fig. 9 is a detail front perspective view of the card member and printing plate, shown in Figs. 4 and 5, respectively, in assembled relation; and Fig. 10 is a detail front perspective view of the front wall shown in Fig. 6.

The form of our invention shown in the accompanying drawings to illustrate our invention comprises a carrier C within which is mounted a card K and a printing plate P.

The carrier C comprises a front wall or layer 20 and a rear wall or layer 22 which preferably are made of a suitable transparent thermoplastic material such as, for example, polyvinyl acetate-chloride, and are of sufficient rigidity to be self sustaining. The two walls 20 and 22 are substantially complementary in outline to each other, the front wall 20 being continuous in form and the rear wall 22 having a substantially rectangular shaped recess 24 formed therein for a purpose which will be discussed in greater detail presently.

The card K is of somewhat smaller outline than the walls 20 and 22 and has an opening or recess 26 formed therein. The card K forms the identification member of our novel printing device and is adapted to carry the necessary identification data, such as, for example, the serial number N of the card, and the signature S of the user, disposed around the recess 26, together with other data such as, for example, the name B of the company or business institution issuing the credit card, and the rules and regulations, not shown, governing the issuance and use of the credit card. Thus it will be noted that the card member K, shown in the drawing illustrating an embodiment of our invention, bears the name of the company issuing the card, the serial number of the card and the signature of the customer to whom the card was issued. The particular information or data impressed on the identification card K will, of course, vary with the business institution issuing the credit card.

It is desirable that a device of the character to which this invention pertains embody means from which a printed impression may be made of certain data such as, for example, the name and address of the customer, so as to insure against error in making out invoices and the like involved in business transactions in which the credit card is used. To this end, in the present instance, a metallic printing plate P is provided which has type characters T embossed thereon to appear in relief on one face and in intaglio on the other.

In the form of our invention shown in the drawing, the type characters T are so embossed in the printing plate P that the portions thereof which appear in intaglio may be read in an ordinary manner. It is not essential that the type characters be embossed in this manner and, if desired, they may be so embossed that the portions appearing in relief may be read in an ordinary manner. However, when the type characters are embossed in the manner shown in the drawings, the device will be inserted in a suitable printing machine in such a way that a sheet, on which an impression is to be made, is positioned on one side of a suitable inking medium, such as an inked ribbon, and the printing plate is disposed on the other side thereof so that when pressure is applied to squeeze the ink ribbon between the sheet and the type characters T, an impression will be made on the sheet. If a plurality of sheets are to be printed in each impression operation, suitable carbon paper may be arranged between the plurality of sheets, in the manner well known in the art, with the coated surface of the carbon paper disposed toward the sheet to be printed and away from the type characters T, so that an impression which may be read in the usual manner will be made as a result of the application of pressure.

The printing plate P, which comprises the printing member of our novel printing device, is complementary in outline to the recess 26 in the card K and is of such size that when properly inserted in the recess 26, for a purpose which will be discussed in greater detail hereinafter, it will fit relatively snugly therein. Two notches 28 and 29 are formed in respective end portions of the plate P for a reason which will also be presently explained.

In the preferred construction and assembly of the embodiment of our novel device shown in the drawing, a card K is prepared, bearing the proper serial number and other data and is signed by the customer to whom the credit-card is to be issued. A printing plate P is embossed with the name and address of the customer. The embossed printing plate P is then placed in the recess 26 in the card K in the manner shown in Fig. 9, and the assembled card and plate are then placed in centered position between a front wall member 20 and a rear wall member 22, with the front wall 20 and the rear wall 22 in alignment with each other, and with the recess 24 in the rear wall 22 in alignment with the recess 26 in the card K, the rear wall 22 being positioned adjacent to that face of the printing plate P on which the type characters T appear in relief. The outline of the recess 24 in the rear wall member 22 is somewhat smaller than the outline of the recess 26 in the card K so that when the wall members 20 and 22, the card K and the printing plate P are positioned in the above discussed manner with the recess 24 aligned with the recess 26, the inner marginal edge portion of the rear wall member 22 overlaps the peripheral edge portion of the printing plate P, as is best shown in Fig. 3.

With the wall members 20 and 22, the card K, and the printing plate P assembled in this manner they may be secured in this position by applying heat and pressure to the wall members 20 and 22 by means of two compression members applied on opposite faces of the printing device, namely, on the outside surfaces or faces of the front and rear wall members 20 and 22, in a manner well known in the art, to thereby squeeze and bond the marginal edge portions of the wall members 20 and 22 together. This application of heat and pressure on the wall members 20 and 22 also causes a portion of the material from which the wall members 20 and 22 are formed to flow into the notches 28 and 29 to thereby positively secure the printing plate P in position in the recess 26.

Thus, it will be seen that the front wall 20 and the rear wall 22 form effective means for retaining the printing plate P in the recess 26 of the identification card K.

The wall members 20 and 22 are of such thickness that the rear wall 22 will not interfere with the making of printing impressions from the type characters T which project outwardly through the recess 24 and it will be noted that when the wall members 20 and 22 are constructed of transparent materials the printing plate P is visible at both faces of the card K. For this purpose we prefer to use sheets of the aforementioned thermoplastic material having a thickness of ten-thousandths of an inch, although we do not limit ourselves thereto and other suitable thicknesses of suitable materials may be used without departing from the purview of our invention.

As is best shown in Fig. 2, the rear wall member 22 in the assembled printing device C has a roughened or stippled outer surface which renders the printing device easy to grip in the fingers without danger of slipping. This roughened or stippled surface may be readily afforded on the rear wall member 22 during the aforementioned bonding operation, by interposing a sheet of suitable fabric material, such as, for example, canvas duck or the like, between the outer surface of the rear wall member 22 and the compression member applied thereto.

In the use of a credit-card constructed in the manner of our novel printing device, the customer to whom the card is issued can readily carry it on his person, the device being of a desirable, compact and thin form with no protuberances extending therefrom and being well protected from mutilation by the tough and substantially moisture-proof, though transparent, carrier C. When the customer desires to make a purchase on credit at one of the outlets of the business institutions that issued the card, he merely hands the card to the clerk or other representative from whom the purchase is made; the clerk can then compare the signature, if desired, of the person making the purchase with the signature which the card bears, check the data on the card to ascertain that the card is currently valid, and then insert the card into the printing machine in which the sales slip or other record of the sale is being made and print the name, address and whatever other identifying data which may be embodied on the printing plate P, on the sales slip. Such a device, it will be seen has the advantage of providing an easily carried and readily available means of identification, and has the further advantage of providing a device from which the name of the customer to whom credit was extended, and such other identifying data as may be desired, may be printed directly therefrom so as to eliminate the possibility of copying errors.

Thus, from the foregoing it will be seen that we have provided a novel printing device which is well adapted to be used as a credit card and which is thin and compact in form; is readily carried; can be readily used to print the name and address, and the like, of the customer to whom the card is issued; affords a good check as to the authenticity thereof; is made of a minimum of material; and can be readily and economically constructed commercially.

Hence, while we have illustrated and described the preferred embodiment of our invention, it is to be understood that this is capable of variation and modification and we therefore do not wish to be limited to the precise details set forth, but desire to avail ourselves of such changes and alterations as fall within the purview of the following claims.

We claim:

1. A printing device comprising a card member having an opening formed therein, a printing plate mounted in said card member within said opening and having two recesses formed therein, said printing plate having type characters projecting from one face thereof, and a carrier member, said carrier member comprising a transparent sheet member covering one face of said card member and extending across said one face of said printing plate, and another transparent sheet member covering the other face of said card member and the other face of said printing plate, said sheet members being bonded together around the periphery of said card member, one of said sheet members projecting down into said recesses so as to interlock therewith, and said sheet members being bonded together in areas effective to maintain such interlock, said type characters projecting outwardly through said first mentioned transparent sheet member.

2. A printing device comprising a card member having an opening formed therein and affording identification means, a metallic printing plate complementary to said opening and mounted in said card member within said opening, said printing plate having notches formed therein at opposite ends thereof, said printing plate having type characters embossed therein, a transparent sheet member covering one face of said card member and one face of said printing plate, said sheet member extending beyond the outer periphery of said card member, and another transparent sheet member covering the other face of said card member and extending across peripheral edge portions of the other face of said printing plate, said sheet members projecting into said recesses to interlock therewith and being bonded together exteriorly of said card member in areas effective to maintain said interlock, said card member and said printing plate being visible through both of said sheet members, said type characters projecting outwardly through said other sheet member.

3. A printing device adapted for use as a credit identification or the like and comprising a card having a mounting opening formed therein and affording identification means on at least one face of the card between said mounting opening and the edges of the card, a metallic printing plate complementary to said mounting opening and disposed within said mounting opening in said card so as to be held against movement generally parallel to said card by engagement of the edge portions of the printing plate with the edge portions of the card that define said mounting opening, said printing plate having embossed type characters formed thereon so as to project from one face thereof in spaced relation to the edges of the printing plate and thereby define a flat border area on said one face of said printing plate, a first transparent sheet member covering the other face of said printing plate and the corresponding face of said card, and a second transparent sheet member having a clearance opening formed therein somewhat smaller than the mounting opening in said card and disposed against said one face of said printing plate and the corresponding face of said card in such a relation that said type characters project outwardly through said clearance opening in said second sheet and the portions of said second sheet that border such clearance opening overlie and engage at least a portion of said flat border area on said one face of said printing plate, both of said sheet members being extended beyond the outer edges of said card and being bonded together exteriorly of said card to retain said printing plate in position in said mounting opening in said card.

4. A printing device adapted for use as a credit identification or the like and comprising a card having a mounting opening formed therein and affording identification means on at least one face of the card between said mounting opening and the edges of the card, a metallic printing plate complementary to said mounting opening and disposed snugly within said mounting opening in said card and in substantially the same plane of said card so as to be held against movement generally parallel to said card by engagement of the edge portions of the printing plate with the edge portions of the card that define said mounting opening, said printing plate having embossed type characters formed thereon so as to project from one face thereof in spaced relation to the edges of the printing plate and thereby define a flat border area on said one face of said printing plate, a first relatively rigid plastic sheet member covering the other face of said printing plate and the corresponding face of said card, and a second relatively rigid plastic sheet member having a clearance opening formed therein somewhat smaller than the mounting opening in said card and disposed against said one face of said printing plate and the corresponding face of said card in such a relation that said type characters project outwardly through said clearance opening in said second sheet and the portions of said second sheet that border such clearance opening overlie and engage at least a portion of said flat border area on said one face of said printing plate, both of said sheet members being extended beyond the outer edges of said card and being bonded together exteriorly of said card to retain said printing plate in position in said complemental opening in said card, the plastic sheet that is disposed over the identification means on said card being transparent.

COURTNEY LEE COMEGYS.
ELMER A. HAIG.

REFERENCES CITED

The following references are of record in the file of this patent:

UNITED STATES PATENTS

| Number | Name | Date |
|---|---|---|
| 781,222 | Morse | Jan. 31, 1905 |
| 1,288,395 | Duncan | Dec. 17, 1918 |
| 1,435,436 | Williams | Nov. 14, 1922 |
| 1,474,174 | Segall | Nov. 13, 1923 |
| 1,538,386 | De Meurisse | May 19, 1925 |
| 1,801,593 | Dugdale | Apr. 21, 1931 |
| 1,807,958 | Bailey | June 2, 1931 |
| 2,147,384 | Safisberg | Feb. 14, 1939 |
| 2,305,195 | Richter | Dec. 15, 1942 |
| 2,361,670 | Whitehead | Oct. 31, 1944 |